(12) United States Patent  
Kull

(10) Patent No.: US 8,562,218 B2
(45) Date of Patent: Oct. 22, 2013

(54) FLUID DYNAMIC BEARING SYSTEM AND A SPINDLE MOTOR HAVING A FLUID DYNAMIC BEARING SYSTEM

(75) Inventor: Andreas Kull, Donaueschingen (DE)

(73) Assignee: Minebea Co., Ltd., Nagano-Ken (JP)

( * ) Notice: Subject to any disclaimer, the term of this patent is extended or adjusted under 35 U.S.C. 154(b) by 675 days.

(21) Appl. No.: 12/755,793

(22) Filed: Apr. 7, 2010

(65) Prior Publication Data

US 2010/0264763 A1    Oct. 21, 2010

(30) Foreign Application Priority Data

Apr. 15, 2009  (DE) .................. 10 2009 017 700

(51) Int. Cl.
*F16C 32/06* (2006.01)
(52) U.S. Cl.
USPC ............ 384/107; 384/100; 384/120; 384/123
(58) Field of Classification Search
USPC .................. 384/100, 107, 113–115, 120, 123
See application file for complete search history.

(56) References Cited

U.S. PATENT DOCUMENTS

| | | | | |
|---|---|---|---|---|
| 4,726,693 A | * | 2/1988 | Anderson et al. | 384/114 |
| 4,795,275 A | * | 1/1989 | Titcomb et al. | 384/107 |
| 5,558,445 A | * | 9/1996 | Chen et al. | 384/132 |
| 5,707,154 A | * | 1/1998 | Ichiyama | 384/113 |
| 5,791,785 A | * | 8/1998 | Nose et al. | 384/119 |
| 5,810,480 A | * | 9/1998 | Asada et al. | 384/107 |
| 5,908,247 A | * | 6/1999 | Leuthold et al. | 384/114 |
| 5,988,887 A | * | 11/1999 | Lee | 384/107 |
| 6,126,320 A | * | 10/2000 | Ichiyama | 384/112 |
| 6,196,722 B1 | * | 3/2001 | Asada et al. | 384/107 |
| 6,246,136 B1 | * | 6/2001 | Ichiyama | 310/90 |
| 6,296,391 B1 | * | 10/2001 | Hayakawa et al. | 384/119 |
| 6,760,187 B2 | * | 7/2004 | Asada et al. | 360/99.08 |
| 6,904,682 B2 | * | 6/2005 | Takahashi | 29/898.13 |
| 6,905,247 B2 | * | 6/2005 | Kishi | 384/114 |
| 6,939,047 B2 | * | 9/2005 | Gomyo et al. | 384/107 |
| 7,201,517 B2 | | 4/2007 | Gomyo | |

FOREIGN PATENT DOCUMENTS

| | | |
|---|---|---|
| DE | 10 2005 008 881 | 9/2006 |
| DE | 10 2008 017 220 | 10/2008 |
| DE | 10 2007 036 790 | 2/2009 |
| JP | 2004108509 A * | 4/2004 |

\* cited by examiner

*Primary Examiner* — Marcus Charles
(74) *Attorney, Agent, or Firm* — Cooper & Dunham LLP

(57) ABSTRACT

A fluid dynamic bearing including a bearing bush having a central bearing bore in which a shaft is rotatably supported. Surfaces of the shaft and of the bearing bore that face each other are separated from one another by a bearing gap filled with a bearing fluid. A first radial bearing section and a second radial bearing section are disposed along the bearing gap, between which a separator section is disposed. The width of the bearing gap varies with its axial length. The bearing gap has a first inner width ib1 and a second inner width ib2 in the region of the first and of the second radial bearing section on the sides facing the separator section, a first outer width ab1 and a second outer width ab2 on the sides remote from the separator section. According to the invention, the differences resulting from the inner widths and the outer widths, ib1–ab1 and ib2–ab2, lie in an interval of a–t to a+t, where a is greater than zero and t is greater than a.

12 Claims, 6 Drawing Sheets

FLUID DYNAMIC BEARING SYSTEM AND A SPINDLE MOTOR HAVING A FLUID DYNAMIC BEARING SYSTEM

BACKGROUND OF THE INVENTION

The invention relates to a fluid dynamic bearing system according to the characteristics outlined in the preamble of claim 1. These kinds of fluid dynamic bearings are used, for example, for the rotatable support of spindle motors that in turn are used for driving hard disk drives, fans or suchlike.

PRIOR ART

In a well-known design for a fluid dynamic bearing as employed in a spindle motor, a shaft is rotatably supported in a bearing bore in a bearing bush. The diameter of the bore is slightly larger than the diameter of the shaft, so that a bearing gap filled with a bearing fluid remains between the surfaces of the bearing bush and of the shaft. The surfaces facing one another of the shaft and/or of the bearing bush have pressure-generating bearing patterns forming a part of two fluid dynamic radial bearings separated axially from one another. The radial bearings are separated from one another by a separator gap. A free end of the shaft is connected to a hub whose lower surface, together with an end face of the bearing bush, forms a fluid dynamic thrust bearing. For this purpose, one of the surfaces facing each other of the hub or of the bearing bush is provided with pressure-generating bearing patterns.

The two radial bearings as well as the thrust bearing generate a directed pumping effect in a familiar way, so that the bearing fluid circulates in a specific direction through the bearing gap and the recirculation channel. This directed pumping effect is achieved, for example, by using spiral-shaped grooved bearing patterns for the thrust bearing and asymmetric grooved bearing patterns at least at the upper radial bearing adjacent to the opening of the bearing. The lower radial bearing adjacent to the closed end of the bearing may be made asymmetric or even symmetric. The overall pumping effect of the asymmetrically designed radial bearings is then directed in the direction of the separator gap. This goes to ensure that there is always a certain level of positive pressure in the separator gap. Negative pressure is to be avoided in the separator gap, since any gas bubbles dissolved in the bearing fluid could thereby outgas and these gas bubbles could impair the function of the radial bearings.

However, due to manufacturing tolerances the bearing bore may not be exactly cylindrical, but rather slightly tapered. FIG. 2 shows a longitudinal section through a bearing bush 110 having a bearing bore 111. The individual, cylindrical sections of the bearing bore 111 can be seen, the central separator region having a somewhat larger diameter than the radial bearing regions.

Owing to the deviation of the bearing bore from its ideal cylindrical shape due to production limitations, particularly in the region of the fluid dynamic radial bearings, the bearing gap has a width that varies axially along the radial bearings. The smaller the width of the bearing gap, the greater the effect of the grooved bearing patterns and the pressure generated in this region of the gap. This means that it is possible for the preferred pumping direction of the radial bearings to be neutralized or even to reverse direction. FIG. 4 shows a diagram of the pressure distribution in a fluid bearing according to the prior art. The pressure in the bearing gap is plotted over the permissible tolerance range of the diameter of the bearing bore. Various possible pressure distributions of the bearing within the tolerance range are shown. The ordinate shows the pressure in pascal. The waveform of the bearing gap is shown on the abscissa, starting from the thrust bearing region, over the first radial bearing region, the separator region and the second radial bearing region. Curve 160 represents one possible extreme in which the bearing gap and thus the pressure generated by the radial bearings is maximized. In this case, a satisfactory bearing pumping effect in the direction of the separator has been achieved, so that the pressure in the separator is considerably higher than the atmospheric pressure. If, however, the bearing bore deviates unfavorably from its ideal shape due to manufacturing tolerances, the pressure distribution may go to a different extreme, as shown in curve 162. Here, the pressure generated by the radial bearings is considerably less than in curve 160. It can be seen, moreover, that the overall pressure of the two radial bearings is not directed in the direction of the separator, but rather in the opposite direction. Thus a pressure that is lower than the atmospheric pressure prevails in the separator, which incurs the risk of air bubbles outgassing in the bearing fluid. Such negative pressure in the separator should thus be avoided.

It could of course be possible to tighten the specified tolerances so as to prevent the situation according to curve 162 from occurring. However, since the bearing dimensions are very small, mass production with such tolerance specifications is complex and expensive.

U.S. Pat. No. 7,201,517 discloses a hydrodynamic bearing and describes that, due to manufacturing tolerances, the size of the bearing gap and the shape of the grooved bearing patterns may vary. This could result in the development of negative pressure in the separator gap, as described above. To prevent this, the invention proposes to change the shape of the grooved bearing patterns such that a pumping effect in the direction of the separator gap is achieved at all costs. Another possibility is described in which the bearing gap is made larger in the direction of the separator gap so that the pumping effect is also increased in the direction of the separator gap, thus preventing any negative pressure occurring in the separator gap. However, the extent to which the width of the bearing gap changes is not described. With the width of the bearing gap being only a few micrometers, manufacturing tolerances make it impossible to ensure that the width of the bearing gap actually increases in the direction of the separator gap as desired.

SUMMARY OF THE INVENTION

It is the object of the invention to provide a fluid dynamic bearing system of the kind described at the outset in which the build up of negative pressure in the separator region between the radial bearing sections is prevented.

This object has been achieved according to the invention by a bearing system according to the characteristics outlined in patent claim 1. A spindle motor having a fluid dynamic bearing according to the invention that is preferably used for driving a hard disk drive is cited in claim 8.

Preferred embodiments and further advantageous characteristics of the invention are revealed in the subordinate claims.

The fluid dynamic bearing comprises a bearing bush having a central bearing bore and a shaft disposed rotatably in the bearing bore. Surfaces facing each other of the shaft and of the bearing bore are separated from one another by a bearing gap filled with a bearing fluid. Along the bearing gap are disposed a first radial bearing section and a second radial bearing section between which a separator section is disposed. The width of the bearing gap varies with its axial length. In the region of the first and the second radial bearing section at the sides facing the separator section, the bearing gap has a first and a second inner width ib1 and ib2 and at the sides remote from the separator section a first and a second outer width ab1 and ab2.

According to the invention, the differences resulting from the inner and outer width ib1−ab1 and ib2−ab2 lie in an interval of a−t to a+t, where a is greater than zero and t is greater than a.

This means that on statistical average the first and second inner width ib1 and ib2 of the bearing gap is greater than the respective associated first and second outer width ab1 and ab2. Should tolerance conditions be unfavorable, however, the situation might arise that the first and second inner width ib1 and ib2 of the bearing gap is smaller than the respective associated first and second outer width ab1 and ab2. In this case, the difference resulting from the bearing gap widths is, however, very small and has no significant influence on the preferred pumping direction of the radial bearings.

Preferably, parameter a=0.15 micrometers and parameter t is 0.5 micrometers. These values are derived from the bearing geometry and ensure that, independent of manufacturing tolerances, a desired pumping effect can be generated in the direction of the separator, as a result of which the pressure in the separator section is always greater than zero.

In view of the number of bearing components subjected to tolerances, the invention ensures that, statistically speaking for the majority of bearings, the diameter of the bearing bore and thus also the width of the bearing gap at the respective outer end of the radial bearing sections is smaller than at the respective inner end facing the separator section. The bearing bore thus has a diameter that increases steadily along the radial bearing sections in the direction of the separator section. This results in a continuous increase in the width of the bearing gap in the direction of the separator section.

However, the manufacturing tolerance range is so large that the opposite situation could also occur, namely that the diameter of the bearing bore, and thus the width of the bearing gap, at the outer end of the radial bearing sections remote from the separator region is slightly larger than at the inner end facing the separator section. In this case, however, the deviation from the cylindrical form is less than in the opposite situation so that the asymmetry of the radial bearing patterns of the upper thrust bearing and the thus resulting pumping effect oriented in the direction of the separator region are still able to ensure that no negative pressure can occur in the separator region.

In the above-described case, the diameter of the bearing bore is varied to produce a differing width of the bearing gap. At the same time, it is assumed that the shaft diameter remains mostly constant since it can be manufactured with great precision.

In another embodiment of the invention, it is not the diameter of the bearing bore that varies, but rather the diameter of the shaft, thus causing the width of the bearing gap to change. Statistically speaking for the majority of bearings, the diameter of the shaft is then larger at the respective outer end of the radial bearing sections than at the respective inner end adjacent to the separator section. The diameter of the shaft thus decreases along the radial bearing sections in the direction of the separator section, which means an increase in the width of the bearing gap in the direction of the separator section.

In the case of fluid dynamic bearings for spindle motors, as are used, for example, in 2.5 inch hard disk drives, the average width of the bearing gap is between 2 and 5 micrometers. The diameter of the bearing bore is approx. 2-5 millimeters.

According to the invention, the diameter of the bearing bore and/or of the shaft is designed such that the difference between the width of the outer end ab1 and of the inner end ib1 of the bearing gap of the first radial bearing section lies in an interval a−t to a+t, where preferably a=0.15 and t=0.5 micrometers. This means that, using the specified tolerance range, the width of the bearing gap at the inner end of the first radial bearing region, statistically speaking for the majority of bearings, is larger than at the outer end. The same applies for the second radial bearing region, where preferably a=0.15 micrometers and t=0.45 micrometers. Here again, the width of the bearing gap at the inner end of the second radial bearing section, making full use of the specified tolerance range and statistically speaking for the majority of bearings, is larger than the diameter at the outer end.

As an alternative, the diameter of the bearing bore in the radial bearing sections may remain the same and the diameter of the shaft changes instead. The diameter of the shaft between the outer end and the inner end of the second radial bearing section is then −0.15±0.45 micrometers. The diameter of the shaft between the inner end and the outer end of the first radial bearing section is 0.15±0.5 micrometers.

According to the invention, the fluid dynamic bearing is employed in a spindle motor which comprises a stationary and a rotating motor component that are rotatably supported with respect to each other about a central axis. The fluid dynamic bearing comprises the two radial bearings as well as at least one thrust bearing to absorb axial loads. The drive of the spindle motor is realized using an electromagnetic drive unit having a stator that is disposed on the stationary motor component and an annular rotor magnet that is disposed on the rotating motor component lying radially opposite the stator.

In a first embodiment of the spindle motor, the stationary motor component may comprise a bearing bush fixedly disposed in a baseplate, and the rotating motor component may comprise a shaft and a hub connected to the shaft.

In another embodiment of the spindle motor, the stationary motor component can comprise a first bearing component disposed in a baseplate, a shaft held in the first bearing component, and a second bearing component fixed to the shaft, whereas the rotating motor component comprises a rotor component having a bearing bush.

The invention is described below on the basis of several preferred embodiments.

Further characteristics and advantages of the invention can be derived from the embodiments.

DESCRIPTION OF PREFERRED EMBODIMENTS OF THE INVENTION

Figure 1A:
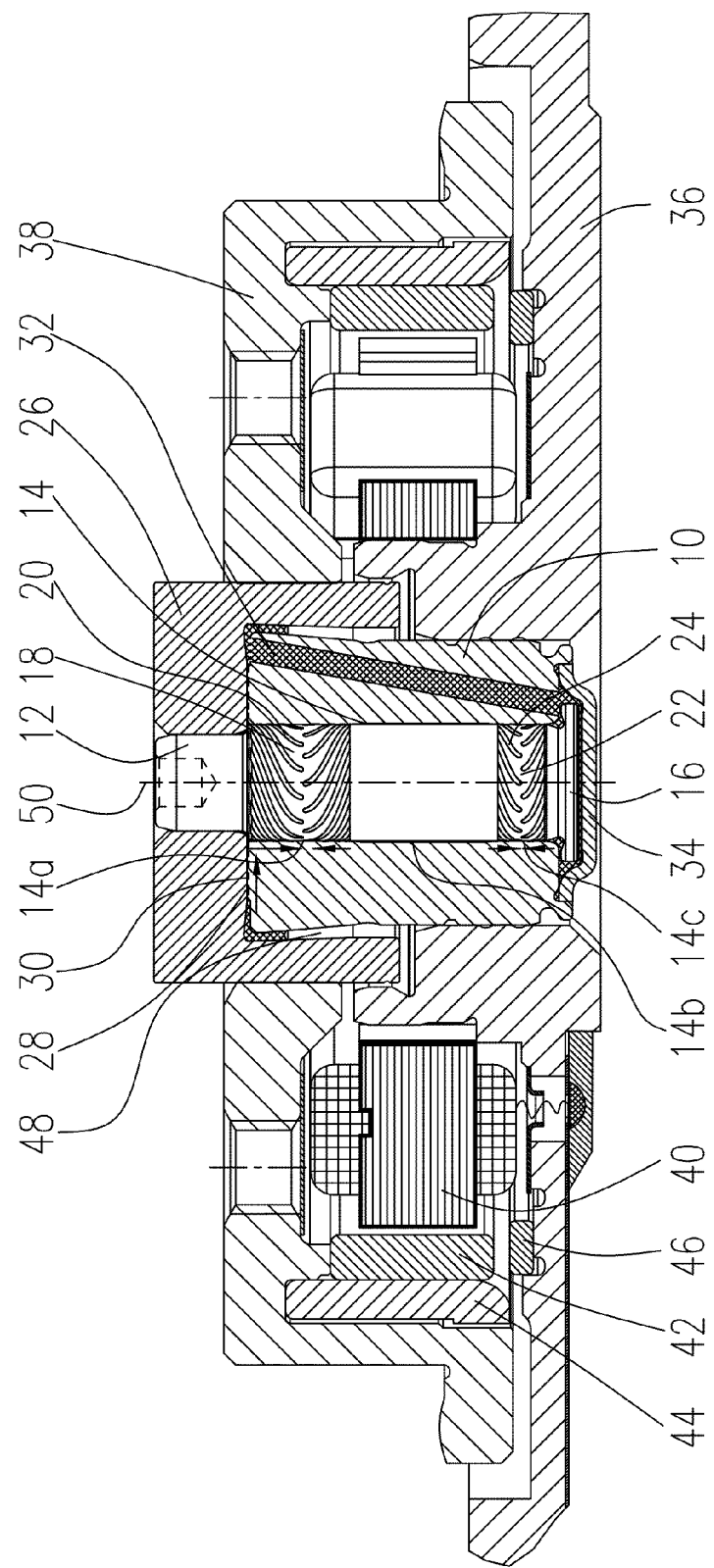
FIG. 1a shows a longitudinal section through a spindle motor having a first embodiment of a fluid dynamic bearing according to the invention having a rotating shaft.

FIG. 1 shows a section through a spindle motor having a fluid dynamic bearing system according to the invention. The spindle motor comprises a stationary bearing bush 10 that has a central bearing bore 11 and that forms the stationary component of the bearing system. A shaft 12 is inserted in the bore of the bearing bush 10, the diameter of the shaft 12 being slightly smaller than the diameter of the bore. A bearing gap 14 filled with a bearing fluid, preferably a bearing oil, remains between the surfaces of the bearing bush 10 and of the shaft 12. The opposing surfaces of the shaft 12 and the bearing bush 10 form two fluid dynamic radial bearings 18, 22 by means of which the shaft 12 is supported in the bearing bush 10 rotatable about a rotational axis 50. The radial bearings 18, 22 are marked by grooved bearing patterns 20, 24 that are provided on the surface of the shaft 12 and/or of the bearing bush 10. On rotation of the shaft 12, the grooved bearing patterns 20, 24 exert a pumping effect on the bearing fluid found in the bearing gap 14 between the shaft 12 and the bearing bush 10, thus giving the radial bearings 18, 22 their load-carrying capacity.

A stopper ring 16 is disposed at the lower end of the shaft 12, the stopper ring 16 being formed integrally with the shaft as one piece or as a separate component and having a larger outside diameter compared to the diameter of the shaft 12. The stopper ring 16 prevents the shaft 12 from falling out of the bearing bush 10. The bearing is closed at this end of the bearing bush 10 by a cover plate 34.

A free end of the shaft 12 is connected to a cup-shaped component 26 that partially encloses the bearing bush. A lower, flat surface of the cup-shaped component 26, together with an end face of the bearing bush 10, forms a fluid dynamic thrust bearing 28. Here, the end face of the bearing bush 10 and/or the opposing surface of the cup-shaped component 26 is provided with grooved bearing patterns 30 that, on rotation of the shaft 12, exert a pumping effect on the bearing fluid found in the bearing gap 14 between the component 26 and the end face of the bearing bush 10, thus giving the thrust bearing 28 its load-carrying capacity. A recirculation channel 32 may be provided in the bearing bush 10, the recirculation channel 32 connecting a section of the bearing gap 14 located at the outer edge of the thrust bearing 28 to a section of the bearing gap 14 located beneath the lower radial bearing 22 and aiding the circulation of bearing fluid in the bearing.

The bearing bush 10 is disposed in a baseplate 36 of the spindle motor. An annular hub 38 is disposed on the cup-shaped component 26, the annular hub 38 having a peripheral rim at its outside circumference. The components 26 and 38 may also be integrally formed as one piece. A stator arrangement 40 encompassing the bearing bush 10 is disposed on the baseplate 36, the stator arrangement 40 comprising a ferromagnetic stator lamination stack as well as corresponding stator windings. This stator arrangement 40 is encompassed by an annular rotor magnet 42 that is disposed in a back yoke ring 44 having a larger diameter and fixed at the inside circumference of the peripheral rim of the hub 38. Should the hub 38 be ferromagnetic, for example, then there is no need for a back yoke ring. An outer rotor motor is illustrated. Alternatively, an inner rotor motor could of course find application. A ferromagnetic metal ring 46 is disposed below the rotor magnet 42, the ferromagnetic ring 46 attracting the rotor magnet which produces a force directed downwards towards the baseplate 36. This force is used for the axial preload of the bearing system.

The bearing gap 14 comprises an axial section that extends along the shaft 10 and the radial bearings 18, 22, and a radial section that extends along the end face of the bearing bush 10 and of the thrust bearing 28. At the radially outer end of its radial section, the bearing gap 14 merges into a gap having a larger gap distance that partially acts as a sealing gap 48. Starting from the bearing gap 14, the gap first extends radially outwards and merges into an axial section that extends along the outside circumference of the bearing bush 10 between the bearing bush 10 and a cylindrical section of the cup-shaped component 26 and forms the sealing gap 48. For a bearing bush 10 diameter of a few millimeters, the width of the sealing gap 48 is typically 50-300 micrometers. The outer sleeve surface of the bearing bush 10 as well as the inner sleeve surface of the cup-shaped component 26 are cylindrical and form the boundary of the sealing gap 48. The sealing gap 48 thus extends substantially parallel to the rotational axis 50.

Figure 1B:
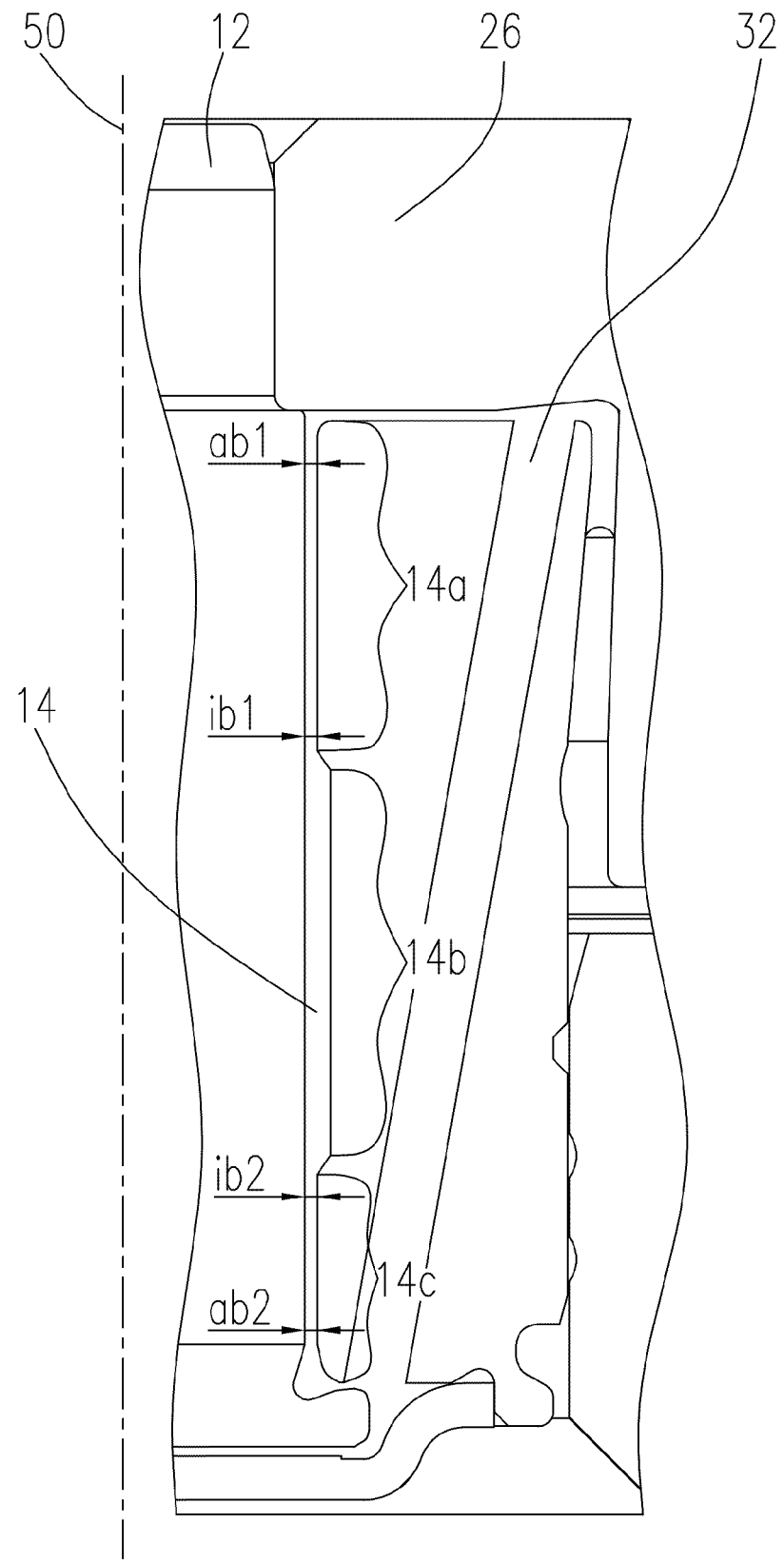
FIG. 1b shows an enlarged detailed view of the bearing gap of FIG. 1.

FIG. 1b shows an enlarged detail of the bearing gap 14 of FIG. 1a. Identical components are provided with the same reference numbers. The three sections of the bearing gap 14 can be clearly seen: the first radial bearing section 14a, the second radial bearing section 14c and the separator section 14b lying in-between. The width of the bearing gap 14 varies over its axial length. In the region of the radial bearing sections 14a, 14c, the bearing gap 14 has an outer width ab1, ab2 that lies on the side remote from the separator section 14b, and an inner width ib1, ib2 that lies on the side facing the separator section 14b.

The width of the bearing gap 14 is determined by the diameter of the bearing bore 11 and by the diameter of the shaft 12. According to the invention, the differences ib1−ab1 and ib2−ab2 of the inner width ib1, ib2 and outer width ab1, ab2 of the bearing gap 14 lie in an interval of a−t to a+t, where a is greater than zero and t is greater than a.

Figure 3:
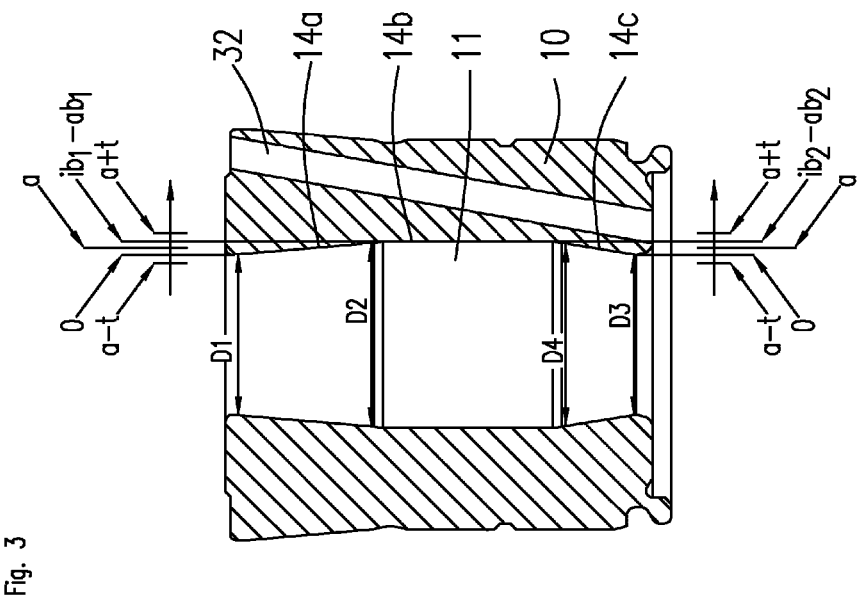
FIG. 3 shows a schematic view of a bearing bush of the bearing according to the invention.
Figure 2:
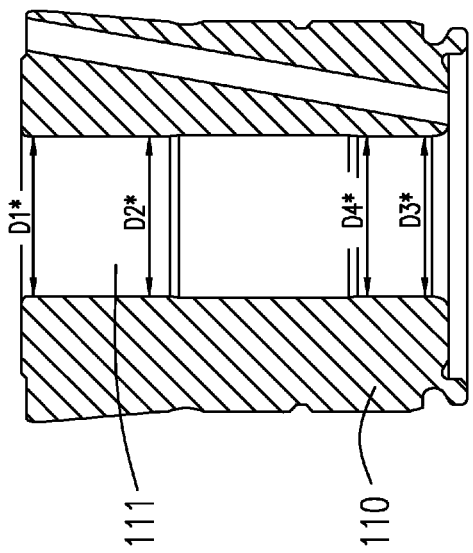
FIG. 2 shows a bearing bush of the bearing according to the prior art.
Figure 4:
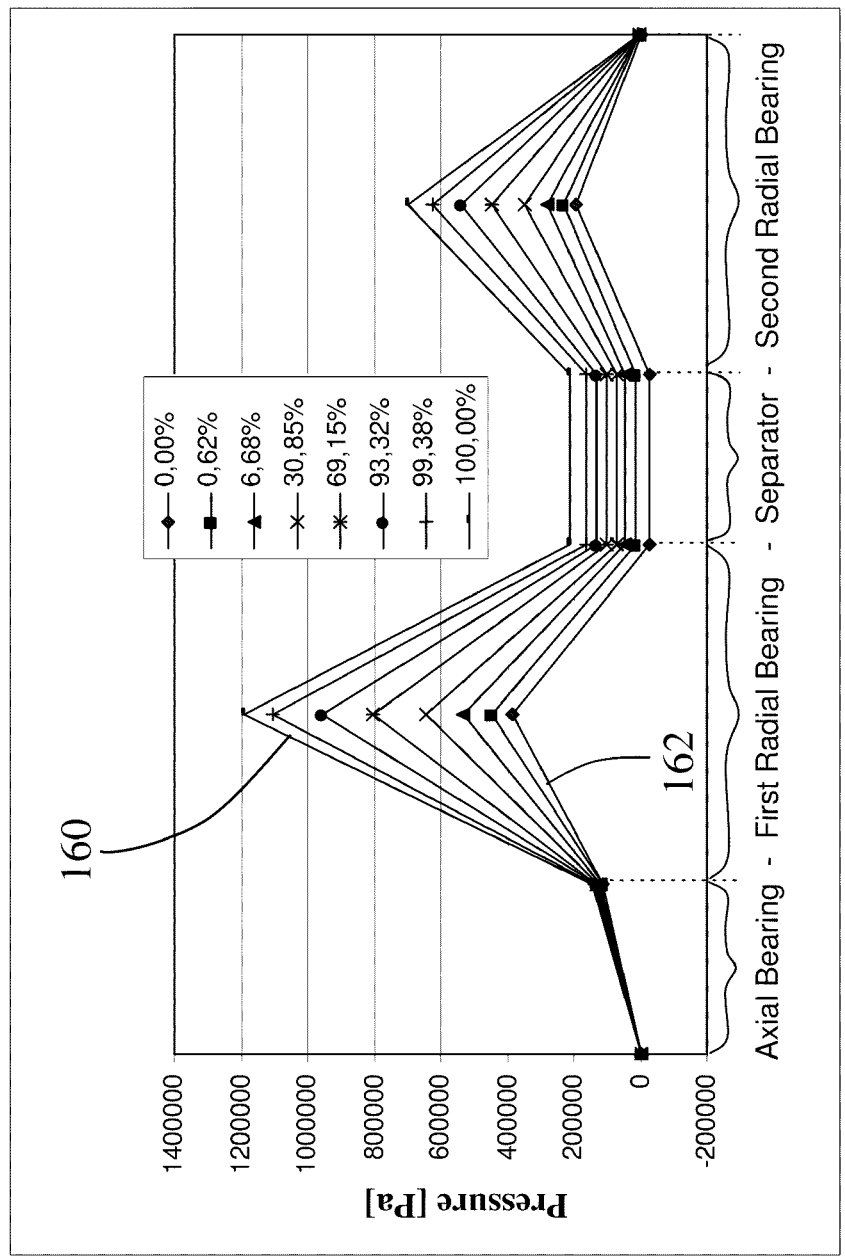
FIG. 4 shows a schematic view of the pressure distribution in the bearing gap for a bearing according to the prior art.

The invention will now be explained on the basis of further drawings. In FIGS. 2 and 3, a variant is shown by way of example in which the diameter of the shaft 12 is kept constant, which means that the variation in the width of the bearing gap 14 stems solely from the variation in the bearing bore 11.

In practice, of course, the two bearing components defining the bearing gap are subject to manufacturing tolerances; both the shaft as well as the bearing bore within the bearing bush, the outside diameter of the shaft being significantly less tolerance-sensitive than the inside diameter of the bearing bore within the bearing bush, so that, de facto, the manufacturing imprecision of the bearing bore accounts for the greater proportion of tolerances.

FIG. 2 shows a bearing bush 110 according to the prior art. It can be seen that the bearing bore 111 is substantially cylindrical in shape in the region of both the radial bearing sections as well as the separator section. Thus D1*=D2* and D3*=D4* applies.

FIG. 3 shows a bearing bush 10 as used in the spindle motor according to FIG. 1. The bearing bush 10 has a bearing bore 11 in which the radial bearing sections 14a and 14c are not cylindrical but rather tapered in shape. The separator section 14b still remains cylindrical in shape. In FIG. 3, the differences in diameter of the bearing bore 11 have been exaggerated to make the situation clearer. Along the first bearing section 14a, the bearing bore 11 has a diameter D1 at the outer end that is smaller than diameter D2 at the inner end adjoining the separator section 14b, so that the diameter of the bearing gap between D1 and D2 continuously increases accordingly. Along the second radial bearing section 14c, the bearing bore 11 has a diameter D3 at the outer end that is smaller than diameter D4 at the inner end adjoining the separator section 14b, so that the diameter of the bearing gap between D3 and D4 continuously increases accordingly. According to the invention, the difference between diameter D1 and diameter D2, in other words D1−D2, lies in an interval of a−t to a+t, preferably in an interval 0.15±0.5 micrometers.

The difference D4−D3 between diameter D4 and diameter D3 of the bearing bore 11 lies in an interval of a−t to a+t, that is preferably given by +0.15±0.45 micrometers. Due to this difference in diameter of the bearing bore 11 within the individual radial bearing regions, the invention stipulates that, statistically speaking for the majority of bearings, the diameter of the bearing bore 11 increases in the direction of the separator section 14b, or respectively, for a smaller number of bearings, decreases slightly. However, due to the pressure conditions prevailing in the bearing, the invention always ensures that positive pressure prevails in the separator. This is always the case according to the invention, even when making full use of the specified tolerances of ±0.5 or ±0.45 micrometers respectively.

Figure 5:
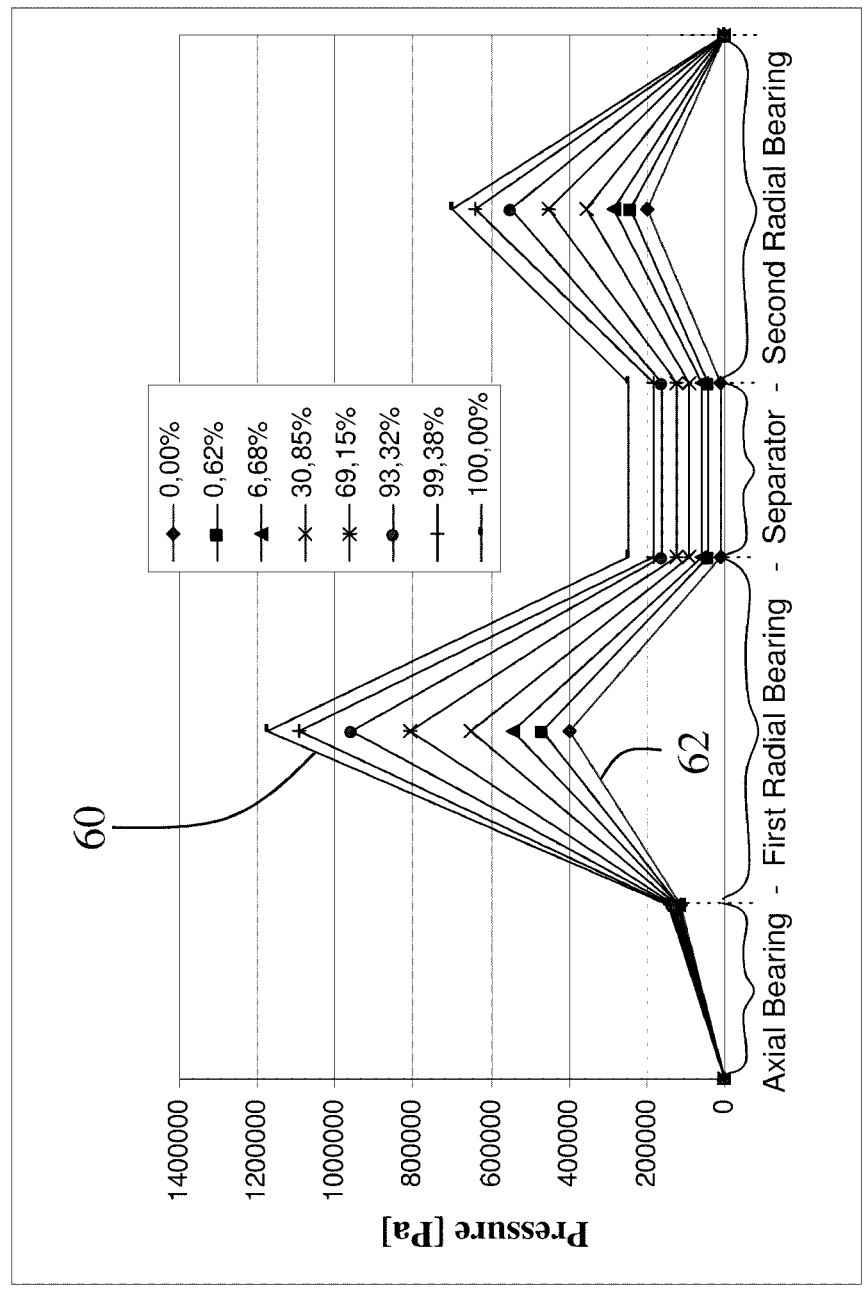
FIG. 5 shows a schematic view of the pressure distribution in the bearing gap for a bearing according to the invention.

FIG. 5 shows a diagram of the pressure in the bearing gap plotted over the permissible tolerance range of the bearing bore diameter. For maximized tolerance, represented by curve 60, the bearing pressure is very high in the region of the first and second radial bearing and the pumping direction, at least for the upper radial bearing 18, is always directed in the direction of the separator. This also makes the pressure in the separator substantially larger than the atmospheric pressure. In the second case, at the lower end of the tolerance limit, which is represented by curve 62, the pressure in the radial bearings is substantially less and, in the first radial bearing, even directed away from the separator. Nevertheless, the pressure in the separator does not fall below the atmospheric pressure, so that there is no risk of air bubbles outgassing out of the bearing fluid.

Figure 6:
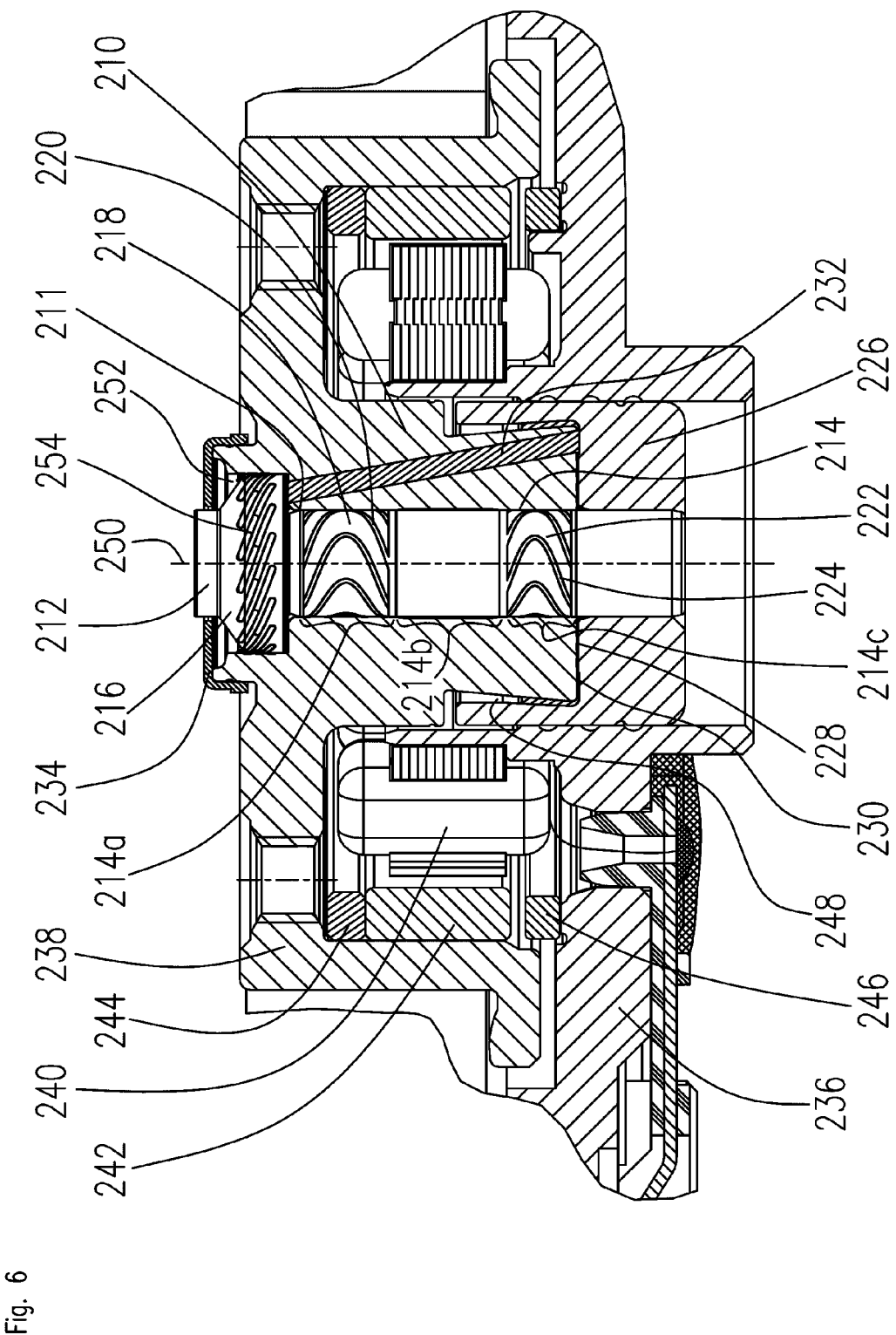
FIG. 6 shows a longitudinal section through a spindle motor having a second embodiment of a fluid dynamic bearing according to the invention having a stationary shaft.

FIG. 6 shows a spindle motor having another preferred embodiment of a fluid dynamic bearing according to the invention. This kind of spindle motor may likewise be used for driving the storage disks of a hard disk drive.

The spindle motor comprises a baseplate 236 that has a substantially central opening in which a first bearing component 226 is accommodated. The first bearing component 226 is given a somewhat cup-like shape and comprises a central opening in which the shaft 212 is fixedly disposed. At the free end of the stationary shaft 212, a second bearing component 216 is disposed that is preferably annular in shape and integrally formed with the shaft 212 as one piece. The said components 212, 216, 226 and 236 form the stationary parts of the spindle motor.

The fluid dynamic bearing comprises a rotor component 238 having a bearing bush 210 that is placed on the shaft 212 and disposed in a space formed by the shaft 212 and the two bearing components 216, 226 rotatable with respect to these components. The upper bearing component 216 is disposed in an annular recess in the rotor component 238. Surfaces adjoining each other of the shaft 212, the bearing bush 210 and the bearing component 216, 226 are separated from one other by a bearing gap 214 open at both ends. The bearing gap 214 is filled with a bearing fluid such as a bearing oil.

The bearing bush 210 has a cylindrical bearing bore 211 on whose inside circumference two cylindrical radial bearing sections 214a, 214c are formed which are separated from one another by a circumferential separator section 214b in-between. These bearing surfaces formed by the radial bearing sections 214a, 214c enclose the stationary shaft 212 at a distance of a few micrometers while forming an axially extending bearing gap 214 and are provided with appropriate grooved bearing patterns 220, 224, so that together with the respective opposing bearing surfaces of the shaft 212, two fluid dynamic radial bearings 218, 222 are formed.

A radially extending section of the bearing gap 214 adjoins the lower radial bearing 222, the radially extending section being formed by radially extending bearing surfaces of the bearing bush 210 and corresponding opposing bearing surfaces of the first bearing component 226. These bearing surfaces form a fluid dynamic thrust bearing 228 having bearing surfaces taking the form of circular rings perpendicular to the rotational axis 250. The fluid dynamic thrust bearing 228 is marked in the conventional way by spiral-shaped grooved bearing patterns 230 that may be provided either on the end face of the bearing bush 210, the first bearing component 226 or on both parts. It is advantageous if all the grooved bearing patterns required for the radial bearings 218, 222 and the thrust bearing 228 are disposed on the bearing bush 210, thus facilitating the manufacture of the bearing, particularly the shaft 212 and bearing component 226.

A sealing gap 248 proportionately filled with bearing fluid adjoins the radial section of the bearing gap 214 in the region of the thrust bearing 228. The sealing gap 248 is formed by opposing outer sleeve surfaces of the bearing bush 210 and inner sleeve surfaces of the bearing component 226 and seals the end of the bearing gap 214 from this side. The sealing gap 248 comprises a radially extending section wider than the bearing gap 214 that merges into an almost axially extending section that widens into a taper and that is defined by an inner circumferential surface of the bearing bush 210 and an outer circumferential surface of the bearing component 226. Alongside its function as a capillary seal, the sealing gap 248 also acts as a fluid reservoir and supplies the amount of fluid required for the useful life of the bearing system. Moreover, filling tolerances and any thermal expansion of the bearing fluid can be compensated. The two surfaces on the bearing bush 210 and the bearing component 226 forming the tapered section of the sealing gap 248 may both be inwardly inclined with respect to the rotational axis 250. This ensures that, on rotation of the bearing, the bearing fluid is forced inwards in the direction of the bearing gap 214 due to centrifugal force.

At the other end of the bearing gap, the bearing bush 210 adjoining the upper radial bearing 218 is designed such that a radially extending surface is formed that, together with a corresponding opposing surface of the second bearing component 216, forms a radial gap. An axially extending sealing gap 252 adjoins the radial gap that seals the fluid bearing system at this end. The sealing gap 252 comprises a pumping seal 254 marked by appropriate grooves which pumps the bearing fluid in the direction of the bearing gap 214. The sealing gap 252 widens at the outer end, preferably having a tapered cross-section and is defined by opposing surfaces of the bearing bush 210 and of the bearing component 216. The sealing gap may be closed by an annular covering cap 234. The covering cap 234 is held on a step on the rotor component 238 and fixed there, for example, by bonding or pressfitting. The inner rim of the covering cap 234, together with the outside circumference of the shaft 212, may form a gap seal that provides added protection against any bearing fluid leaking out of the sealing gap 252.

The patterned bearing surfaces of the fluid bearing system are all preferably located on one component, preferably the bearing bush 210, so that this component can be manufactured relatively simply with the required precision. Since the bearing is mounted in the first bearing component 226, which acts as a flange for connection to the baseplate 236, it is possible to mount the fluid bearing as a modular unit, to fill it with bearing fluid and to test it before the fluid bearing is connected as a modular unit to the baseplate 236.

The electromagnetic drive system of the spindle motor is formed in a familiar way by a stator arrangement 242 disposed on the baseplate 236 and an annular permanent magnet 240 that encompasses the stator arrangement at a spacing and is disposed on an inner circumferential surface of the rotor component 238. The axial position of the rotor magnet 240 is determined by a distance ring 244.

Since the spindle motor has only one fluid dynamic thrust bearing 228 that generates a force in the direction of the second bearing component 216, a corresponding counter force or preload has to be provided at the moving bearing component that keeps the bearing system in axial equilibrium. For this purpose, the baseplate 236 may have a ferromagnetic ring 246 that lies axially opposite the rotor magnet 240 and is magnetically attracted by the rotor magnet 240. This magnetic force of attraction acts in opposition to the force of the thrust bearing 228 and keeps the bearing axially stable. As an alternative or in addition to this solution, the stator arrangement 242 and the rotor magnet 240 may be disposed axially offset with respect to one other such that the rotor magnet 240 is disposed axially further away from the baseplate 236 than the stator arrangement 242. This enables an axial force to be built up by the magnetic system of the motor that acts in opposition to the thrust bearing 228.

To ensure continuous flushing of the bearing system with bearing fluid, a recirculation channel 232 is provided in a known manner. The recirculation channel 232 is preferably disposed in the rotor component, filled with bearing fluid and connects the remote sections of the bearing gap 214 directly to each other so that a circulation of fluid can develop in the bearing.

In the same way as shown in FIG. 1b, the width of the bearing gap 214 varies over its axial length in this bearing system as well. In the region of the radial bearing sections 214a, 214c, the bearing gap 214 has a respective outer width ab1, ab2 (see FIG. 1b) that lies on the side remote from the separator section 214b, and an inner width ib1, ib2 (see FIG. 1b) that lies on the side facing the separator section 214b.

The width of the bearing gap 214 is determined by the diameter of the bearing bore 211 and by the diameter of the shaft 212. According to the invention the differences ib1−ab1 and ib2−ab2 of the inner width ib1, ib2 and the outer width ab1, ab2 of the bearing gap 14 lie in an interval of a−t to a+t, where a is greater than zero and t is greater than a.

IDENTIFICATION REFERENCE LIST

10 Bearing bush
11 Bearing bore
12 Shaft
14 Bearing gap
14a Radial bearing section
14b Separator section
14c Radial bearing section
16 Stopper ring
18 Radial bearing
20 Grooved bearing patterns
22 Radial bearing
24 Grooved bearing patterns
26 Cup-shaped component
28 Thrust bearing
30 Grooved bearing patterns
32 Recirculation channel
34 Cover plate
36 Baseplate
38 Hub
40 Stator arrangement
42 Rotor magnet
44 Back yoke ring
46 Metal ring
48 Sealing gap
50 Rotational axis
60 Curve
62 Curve
110 Bearing bush
111 Bearing bore
160 Curve
162 Curve
ab1 Outer width of the bearing gap in the region of the first radial bearing section
ib1 Inner width of the bearing gap in the region of the first radial bearing section
ab2 Outer width of the bearing gap in the region of the second radial bearing section
ib2 Inner width of the bearing gap in the region of the second radial bearing section
a+/−t Interval
D1, D1* Diameter
D2, D2* Diameter
D3, D3* Diameter
D4, D4* Diameter
210 Bearing bush
211 Bearing bore
212 Shaft
214 Bearing gap
214a Radial bearing section
214b Separator section
214c Radial bearing section
216 Bearing component
218 Radial bearing
220 Grooved bearing patterns
222 Radial bearing
224 Grooved bearing patterns
226 Bearing component
228 Thrust bearing
230 Grooved bearing patterns
232 Recirculation channel
234 Covering cap
236 Baseplate
238 Rotor component
240 Stator arrangement
242 Rotor magnet
244 Distance ring
246 Metal ring
248 Sealing gap
250 Rotational axis
252 Sealing gap
254 Pumping seal

The invention claimed is:

1. A fluid dynamic bearing comprising a bearing bush (10, 210) having a central bearing bore (11, 211) and a shaft (12, 212) disposed in the bearing bore,
wherein the surfaces of the shaft (12, 212) and of the bearing bore (11, 211) that are facing each other are separated from one another by a bearing gap (14, 214) filled with a bearing fluid, and wherein the shaft (12, 212) and the bearing bush (10, 210) are rotatable with respect to each other,
wherein a first radial bearing section (14a, 214a) and a second radial bearing section (14c, 214c) are disposed along the bearing gap (14, 214), and a separator section (14c, 214c) is disposed between the radial bearing sections, and
wherein the bearing gap (14, 214) has a first inner width ib1 and a second inner width ib2 in the region of the first and of the second radial bearing section (14a, 14c; 214a, 214c) on the sides facing the separator section (14b, 214b) and a first outer width ab1 and a second outer width ab2 on the sides remote from the separator section (14b, 214b), wherein spatial differences ib1−ab1 and ib2−ab2 lie within a tolerance range of a−t micrometers to a+t micrometers, where a>0 and t>a.

2. A fluid dynamic bearing according to claim 1, wherein a=0.15 micrometers and t=0.5 micrometers.

3. A fluid dynamic bearing according to claim 1, wherein the average gap width of the bearing gap (14, 214) is between 2 and 5 micrometers.

4. A fluid dynamic bearing according to claim 1, wherein the bearing bore (11, 211) has a varying diameter along the radial bearing sections (14a, 14c; 214a, 214c).

5. A fluid dynamic bearing according to claim 1, wherein the shaft (12, 212) has a varying diameter along the radial bearing sections (14a, 14c; 214a, 214c).

6. A fluid dynamic bearing according to claim 1, wherein, along the first bearing section (14a, 214a), the bearing gap (14; 214) has a diameter D1 at an outer end that is smaller than a diameter D2 at an inner end, and wherein the diameter of the bearing gap (14; 214) increases continuously between D1 and D2.

7. A fluid dynamic bearing according to claim 1, wherein, along the second radial bearing section (14c; 214c), the bearing gap (14; 214) has a diameter D3 at an outer end that is smaller than a diameter D4 at an inner end, and wherein the diameter of the bearing gap (14; 214) increases continuously between D3 and D4.

8. A spindle motor preferably for driving a hard disk drive comprising:
  a stationary motor component,
  a rotating motor component that is rotatably supported with respect to the stationary motor component about a central rotational axis (50; 250),
  a fluid dynamic bearing comprising a bearing bush (10, 210) having a central bearing bore (11, 211) and a shaft (12, 212) disposed in the bearing bore, wherein the surfaces facing each other of the shaft (12, 212) and of the bearing bore (11, 211) are separated from one another by a bearing gap (14, 214) filled with a bearing fluid, and wherein the shaft (12, 212) and the bearing bush (10, 210) are rotatable with respect to one another, wherein a first radial bearing section (14a, 214a) and a second radial bearing section (14c, 214c) are disposed along the bearing gap (14, 214), and a separator section (14c, 214c) is disposed between the radial bearing sections, and the bearing gap (14, 214) has
    a first inner width ib1 and a second inner width ib2 in the region of the first and of the second radial bearing section (14a, 14c; 214a, 214c) on the sides facing the separator section (14b, 214b) and
    a first outer width ab1 and a second outer width ab2 on the sides remote from the separator section (14b, 214b), wherein the spatial differences ib1−ab1 and ib2−ab2 lie within a tolerance range of a−t micrometers to a+t micrometers, where a>0 and t>a, and an electromagnetic drive unit having a stator (40; 240) that is disposed on the stationary motor component, and an annular rotor magnet (42; 242), that is disposed on the rotating motor component lying opposite the stator.

9. A spindle motor according to claim 8, wherein the stationary motor component has a bearing bush (10) disposed in a baseplate (36).

10. A spindle motor according to claim 8, wherein the stationary motor component comprises a first bearing component (226) disposed in a baseplate (236), a shaft (212) held in the first bearing component and a second bearing component (216) fixed to the shaft.

11. A spindle motor according to claim 8, wherein the rotating motor component comprises a shaft (12) and a hub (38) connected to the shaft.

12. A spindle motor according to claim 8, wherein the rotating motor component comprises a rotor component (238) having a bearing bush (210).

* * * * *